(12) United States Patent
Liu et al.

(10) Patent No.: US 10,437,044 B2
(45) Date of Patent: Oct. 8, 2019

(54) MEMS LIGHT VALVE AND DISPLAY DEVICE

(71) Applicant: BOE TECHNOLOGY GROUP CO., LTD., Beijing (CN)

(72) Inventors: Zhen Liu, Beijing (CN); Feng Guan, Beijing (CN); Ming Zhu, Beijing (CN); Jikai Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 208 days.

(21) Appl. No.: 15/500,900

(22) PCT Filed: Apr. 25, 2016

(86) PCT No.: PCT/CN2016/080117
§ 371 (c)(1),
(2) Date: Jan. 31, 2017

(87) PCT Pub. No.: WO2017/133086
PCT Pub. Date: Aug. 10, 2017

(65) Prior Publication Data
US 2018/0217371 A1    Aug. 2, 2018

(30) Foreign Application Priority Data
Feb. 3, 2016   (CN) .......................... 2016 1 0077556

(51) Int. Cl.
*G02B 26/02* (2006.01)
*G02B 5/26* (2006.01)
*G02B 5/20* (2006.01)

(52) U.S. Cl.
CPC ............ *G02B 26/023* (2013.01); *G02B 5/201* (2013.01); *G02B 5/26* (2013.01)

(58) Field of Classification Search
CPC ......... G02B 26/023; G02B 26/02; G02B 5/26
(Continued)

(56) References Cited

U.S. PATENT DOCUMENTS 6,288,824 B1    9/2001   Kastalsky
9,632,307 B2 *  4/2017   Brosnihan ............ G02B 26/023
(Continued)

FOREIGN PATENT DOCUMENTS

CN    102346269 A    2/2012
CN    102602160 A    7/2012
(Continued)

OTHER PUBLICATIONS

Zhou et al., CN 102346269, Feb. 8, 2012, translation obtained from Proquest on Mar. 13, 2019.*
(Continued)

*Primary Examiner* — Kristina M Deherrera
(74) *Attorney, Agent, or Firm* — Kinney & Lange, P.A.

(57) ABSTRACT

Embodiments of the present disclosure provide a MEMS light valve, which includes: a fixed grating partitioned into first regions and second regions, which are arranged alternately, wherein the fixed grating comprises reflective units configured within the first regions for reflecting at least part of incident light and the second regions do not reflect light; and a movable grating located at a side of the fixed grating to which outside light is incident and movable in a plane where the movable grating is located, wherein the movable grating is capable of block part or all of the reflective units during moving. The embodiments of the present disclosure are adopted to manufacture of a MEMS light valve and a display device including the MEMS light valve.

15 Claims, 7 Drawing Sheets

(58) Field of Classification Search
USPC .................................................. 359/230, 233
See application file for complete search history.

(56) References Cited

U.S. PATENT DOCUMENTS

| | | |
|---|---|---|
| 2010/0149625 A1 | 6/2010 | Lu et al. |
| 2011/0181957 A1 | 7/2011 | Iizuka et al. |

FOREIGN PATENT DOCUMENTS

| | | |
|---|---|---|
| CN | 103185979 A | 7/2013 |
| CN | 104058363 A | 9/2014 |
| CN | 104765143 A | 7/2015 |
| CN | 104834085 A | 8/2015 |
| CN | 104943614 A | 9/2015 |
| CN | 105467579 A | 4/2016 |

OTHER PUBLICATIONS

Chinese Search Report, for Chinese Patent Application No. 201610077556.X, dated May 16, 2016, 9 pages.
International Search Report and Written Opinion (including English translation of Box V) dated Aug. 26, 2016, for corresponding PCT Application No. PCT/CN2016/080117.
First Chinese Office Action (including English translation) dated Jul. 28, 2016, for corresponding Chinese Application No. 201610077556.X.

* cited by examiner

MEMS LIGHT VALVE AND DISPLAY DEVICE

CROSS-REFERENCE TO RELATED APPLICATIONS

This application is a Section 371 National Stage Application of International Application No. PCT/CN2016/080117, filed on Apr. 25, 2016, entitled "MEMS light valve and display device", which claims priority to Chinese Application No. 201610077556.X, filed on Feb. 3, 2016, incorporated herein by reference in their entirety.

BACKGROUND

1. Technical Field

Embodiments of the disclosure relate to display technology field, and particularly to a MEMS light valve and a display device.

2. Description of the Related Art

Micro-electro-mechanical system (MEMS) is a high-tech device with a size in order of millimeter or less based on micro-electronic, micro-mechanical and material science, has interior structures generally in order of micron or even nano-meter, and is a separated smart system. With rapid development of the MEMS technology, a display based on MEMS technology has been become an importance aspect of a display in the future.

With relative to liquid crystal display, MEMS display uses a MEMS light valve, replacing a liquid crystal layer, to control transmission of light, so as to achieve display of image. The MEMS display does not need polarizing sheet, and has a largely increased light efficiency and reduced power consumption and product cost.

SUMMARY

Embodiments of the present disclosure provide a MEMS light valve, and a display device, which can achieve black and white image display by using outside light, and have a simpler structure with relative to those in prior arts.

In order to achieve the above objects, embodiments of the disclosure include the following schemes.

According to an aspect of the present disclosure, there is provided a MEMS light valve, characterized by comprising:

a fixed grating partitioned into first regions and second regions, which are arranged alternately, wherein the fixed grating comprises reflective units configured within the first regions for reflecting at least part of incident light and the second regions do not reflect light; and a movable grating located at a side of the fixed grating to which outside light is incident and movable in a plane where the movable grating is located, wherein the movable grating is capable of block part or all of the reflective units during moving.

In an embodiment, the reflective units are reflective color filters and are configured to reflect light with one certain color when the outside light is incident to the reflective color filters.

In an embodiment, the reflective color filter comprises a plurality of projections provided on an upper surface of the reflective color filter such that the reflective color filter reflects light with one certain color when the outside light is incident to the upper surface provided with the plurality of projections.

In an embodiment, the projections are configured to reflect light of a specific wavelength in manner of enhanced intensity while dissipating light having other wavelengths when outside white light is incident to the upper surface provided with the plurality of projections, such that the reflective color filter only reflects the light with one certain color.

In an embodiment, the projections are each configured in a point shape and arranged in array in the first regions; or, the projections are each configured in a strip shape and arranged in parallel in the first regions.

In an embodiment, the reflective color filter comprises a body layer, wherein the plurality of projections are provided on an upper surface of the body layer.

In an embodiment, the body layer and the projections are formed from a same metal.

In an embodiment, the fixed grating further comprises a light absorbing layer located within the second regions.

In an embodiment, the light valve further comprises a control device coupled to the movable grating such that the movable grating is floated and is driven to move in a plane where the movable grating is located.

In an embodiment, the control device comprises an electrode drive portion and a deformable retractable portion, which are respectively arranged at opposite sides of the movable grating in a movement direction of the movable grating;

the electrode drive portion comprises: a drive electrode, a inducing electrode, and a drive beam and a sensing beam that are arranged to be opposite to each other, wherein the drive electrode is coupled with the drive beam and the sensing beam is respectively coupled with the inducing electrode and the movable grating;

the deformable retractable portion comprises: a bracket and a deformable beam, wherein the deformable beam is respectively coupled to the bracket and the movable grating so as to allow the movable grating to move, wherein the movable grating is moved by attraction and repulsion between the drive electrode and the inducing electrode.

In an embodiment, the deformable beam is elastic.

In an embodiment, the reflective color filter is any one of the following: a red filter, a green filter, a blue filter, a yellow filter, a fuchsin filter, and a cyan filter.

According to another aspect, there is provided a display device comprising a plurality of pixels, each of which is composed of sub-pixels, and each of the sub-pixels comprises the above MEMS light valve.

In an embodiment, the reflective unit of the MEMS light valve is a reflective color filter; and the reflective color filter comprises: a plurality of projections provided on an upper surface of the reflective color filter such that the reflective color filter reflects light with one certain color when the outside light is incident to the upper surface provided with the plurality of projections; and each of the pixels comprises three sub-pixels which respectively reflect three primary color lights.

Embodiments of the present disclosure provide a display device, which can achieve black and white image display by using outside light and has a simpler structure with relative to those in prior arts. The display device may be implemented to a television, a digital camera, a mobile phone, a tablet computer and any products or components that have display functions.

BRIEF DESCRIPTION OF THE DRAWINGS

In order to more clearly describe embodiments of the present discloses or schemes in prior arts, the drawings that are used to illustrate the embodiments or the schemes in prior arts will be described in brief. Obviously, the drawings described below are merely some embodiments of the present disclosure. Other drawings may be obtained by those skilled in the art without inventive labor based on the drawings.

REFERENCE SYMBOLS ARE LISTED AS BELOW

1—movable grating; 10—light transmitting portion of the movable grating; 2—fixed grating; 20—light transmitting portion of the fixed grating; 21—first region; 22—second region; 23—reflective unit; 24—reflective color filter; 25—projection; 27—body layer; 3—reflective layer; 41—electrode drive portion; 411—drive electrode; 412—sensing electrode; 413—drive beam; 414—sensing beam; 42—elastic retraction portion; 421—bracket; 422—elastic beam; 100—outside light; 200—substrate.

DETAILED DESCRIPTION OF THE EMBODIMENTS

Technique schemes of the present disclosure will be further described clearly and completely with reference to embodiments of the present disclosure taken in conjunction with the accompanying drawings. Obviously, the embodiments that will be described are merely some embodiments of the present disclosure. All other embodiments that are obtained by those skilled in the art based on the described embodiments without inventive labor belong to scope of the present invention.

Figure 1:
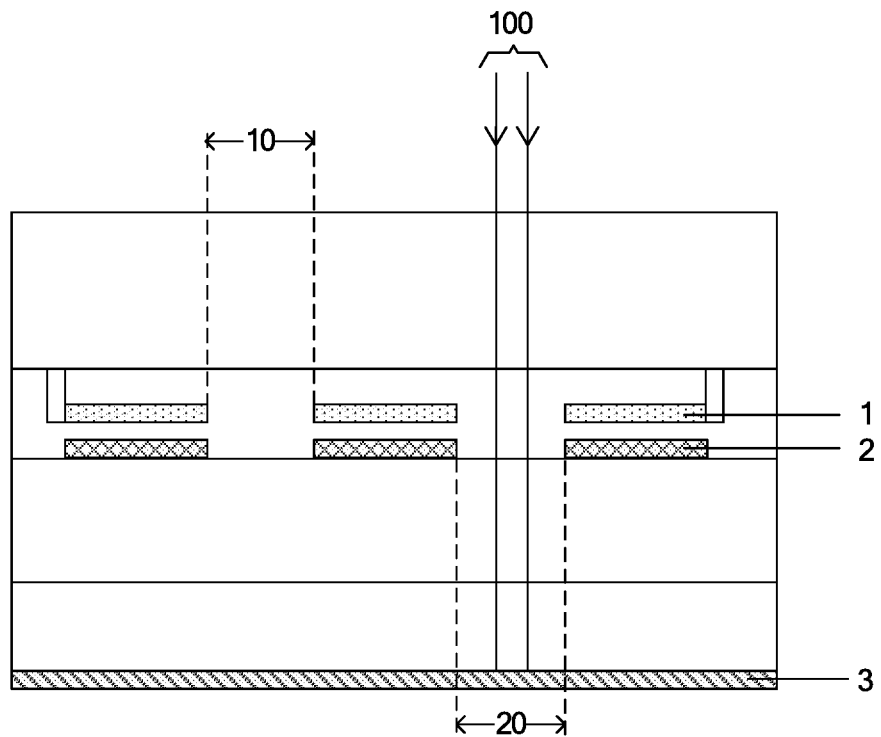
FIG. 1 is a structural schematic view of a MEMS display device in prior art.

As shown in FIG. 1, the MEMS light valve includes a movable grating 1 and a fixed grating 2 configured to be opposite to each other. Outside light 100 is needed to transit through a light transmitting portion 20 of the fixed grating 2 to be incident onto a reflective layer 3 and is reflected out by the reflective layer 3. In this configuration, amount of light that is incident onto the reflective layer 3 may be adjusted by adjusting an overlapping area between a light transmission portion 10 of the movable grating 1 and the light transmitting portion 20 of the fixed grating 2, thereby achieving black and white image display. However, the MEMS display includes the MEMS light valve and the reflective layer and thus has a complex structure.

Figure 2A:
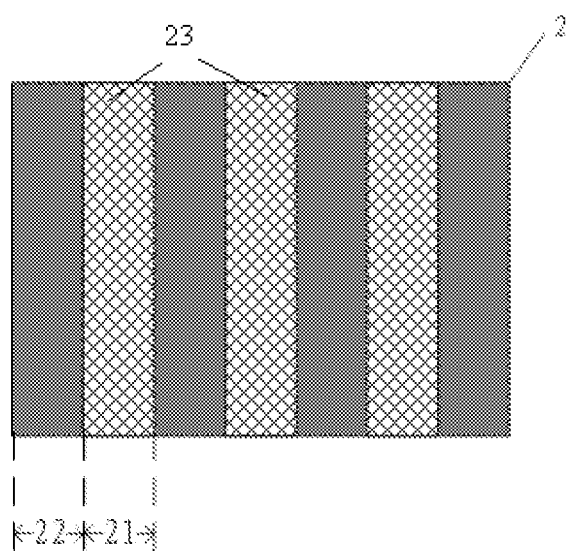
FIG. 2a is a structural schematic view of a fixed grating of a MEMS display device provided according to an embodiment of the present disclosure.
Figure 2B:
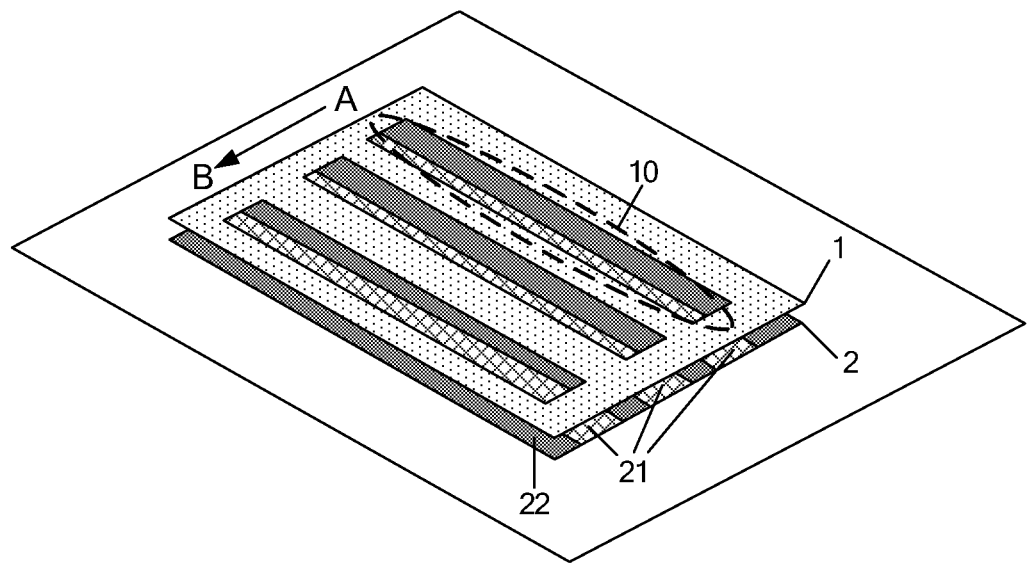
FIG. 2b is a structural schematic view of a fixed grating and a movable grating of a MEMS display device provided according to an embodiment of the present disclosure.

Embodiments of the present invention provide a MEMS light valve. As shown in FIGS. 2a and 2b, the MEMS light valve includes: a fixed grating 2 partitioned into first regions 21 and second regions 22, which are arranged alternately; in an example, the fixed grating 2 comprises reflective units 23 located within the first regions and the second regions 22 do not reflect light; a movable grating 1 located at a side of the fixed grating 2 to which outside light is incident and movable in a plane where the movable grating is located. The movable grating 1 may shield part or all of the reflective unit 23 during moving.

The reflective unit in the embodiment of the present disclosure is configured to reflect at least part of the incident light. The structure of the reflective unit is not limited herein. Exemplarily, the reflective unit may be a reflective sheet, or may be a reflective color filter, and is not limited herein. In addition, the structure configured in the second regions is not limited either. Shapes of the first regions and the second regions are not limited in embodiments of the present disclosure. Embodiments and drawings of the present disclosure are described by taking the first regions and the second regions that are both in a strip shape as an example.

Figure 2C:
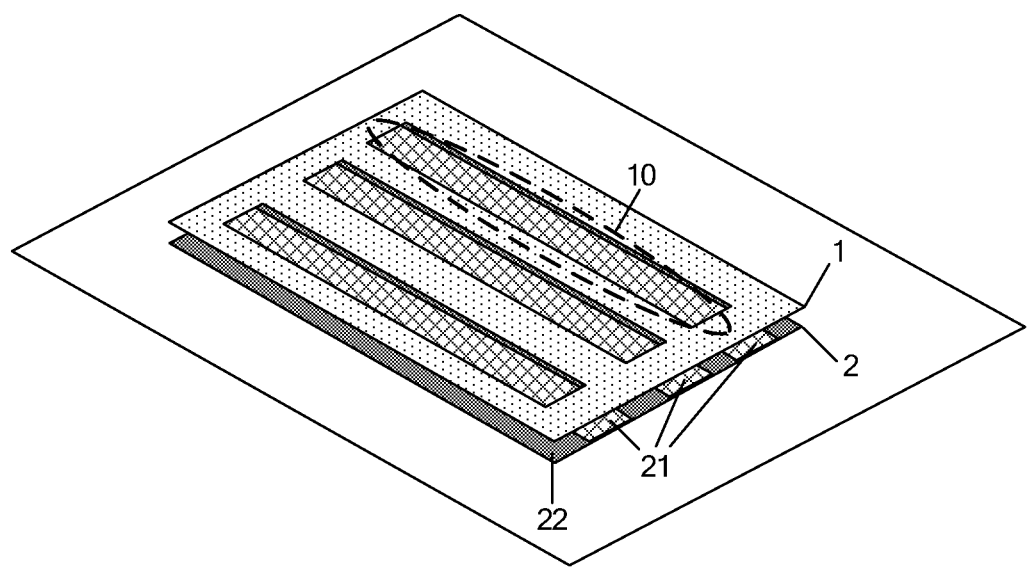
FIG. 2c is a structural schematic view showing the movable grating that have been moved in a direction from A to B shown in FIG. 2b.

As shown in FIG. 2b, the above described movable grating 1 and the fixed grating 2 are arranged to be opposite to each other. The movable grating 1 includes light transmitting portions 10 (for example, the portion in dash block in FIG. 2b). When the movable grating 1 is moved in a width direction of the first regions 21, i.e., the direction from A to B, in a plane where the movable grating 1 is located, the light transmitting portions 10 of the movable grating 1 and the first regions 21 of the fixed grating 2 are staggered. In this instance, the outside light that is incident to the first regions 21 of the fixed grating 2 is reduced. As movement continues, an arrangement as shown in FIG. 2c is obtained, in which the light transmitting portions 10 of the movable grating 1 is overlapped with the first regions 21 of the fixed grating 2. In this moment, the outside light that is incident to the first regions 21 of the fixed grating 2 is increased. Thus, by movement of the movable grating, the overlapping area between the light transmitting portions of the movable grating and the first regions of the fixed grating may be controlled and further, amount of the outside light that is incident to the reflective units of the fixed grating (from the side in FIG. 2 where the movable grating 1 is located) may be controlled. Exemplarily, the light transmitting portions of the movable grating and the first regions of the fixed grating are illustrated to have a strip shape. In addition, the movable grating may be moved in other manner. Specifically, the movement of the movable grating may be designed according to the specific structure of the movable grating and the fixed grating as long as the overlapping area between the light transmitting portions of the movable grating and the first regions of the fixed grating may be controlled and in turn, the amount of the outside light that is incident to the reflective units of the fixed grating may be controlled by movement of the movable grating.

Embodiments of the present disclosure provide a MEMS light valve comprising: a fixed grating partitioned into first regions and second regions, which are arranged alternately, wherein the fixed grating comprises reflective units located within the first regions and configured for reflecting at least part of incident light and the second regions do not reflect light; and, a movable grating located at a side of the fixed grating to which outside light is incident and movable in a plane where the movable grating is located, wherein the movable grating is configured for shielding part or all of the reflective unit during moving. With this configuration, when the outside light is incident to the fixed grating and is reflected by the reflective units of the first regions, the amount of the outside light that is incident to the reflective units of the fixed grating can be controlled by movement of the movable grating, thereby in turn achieving black and white image display by a MEMS display device which is equipped with the MEMS light valve. Compared to the prior art, the valve in present disclosure do not need a reflective layer and thus has a simpler structure.

In an embodiment of the present disclosure, the reflective units are reflective color filters and are configured to reflect light of one certain color. The reflective color filters may include a plurality of projections provided on an upper surface of the reflective color filter such that the reflective color filter reflects at least part of the incident light, such as, light having one certain color, when the outside light is incident to the upper surface provided with the plurality of projections. With this configuration, when applying the above light valve to a display device, the display device may achieve color display by using outside light without any backlight source, thereby largely reducing producing cost.

Figure 3:
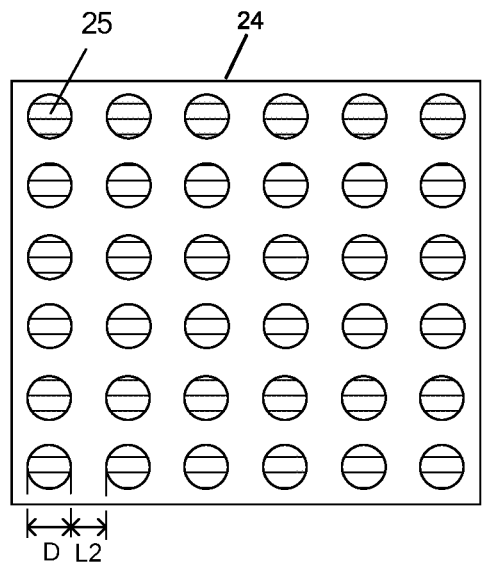
FIG. 3 is a first top view of projections provided according to an embodiment of the present disclosure.
Figure 4:
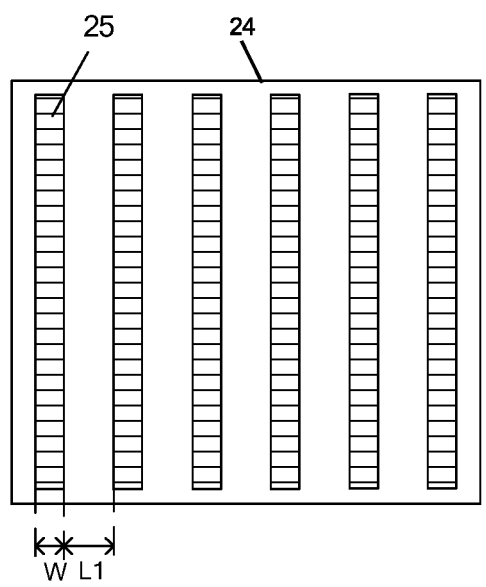
FIG. 4 is a second top view of projections provided according to an embodiment of the present disclosure.

According to an embodiment of the present disclosure, by referring to FIG. 3, the projections 25 are configured in a point shape and arranged in array in the first regions; or, by referring to FIG. 4, the projections 25 are configured in a strip shape and arranged in parallel in the first regions. With this configuration, manufacturing difficulties may be reduced.

Figure 5:
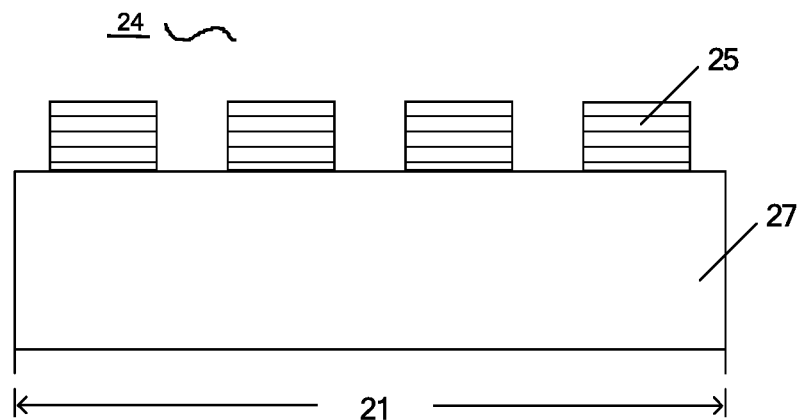
FIG. 5 is a structural schematic view of a reflective color filter provided according to an embodiment of the present disclosure.
Figure 6:
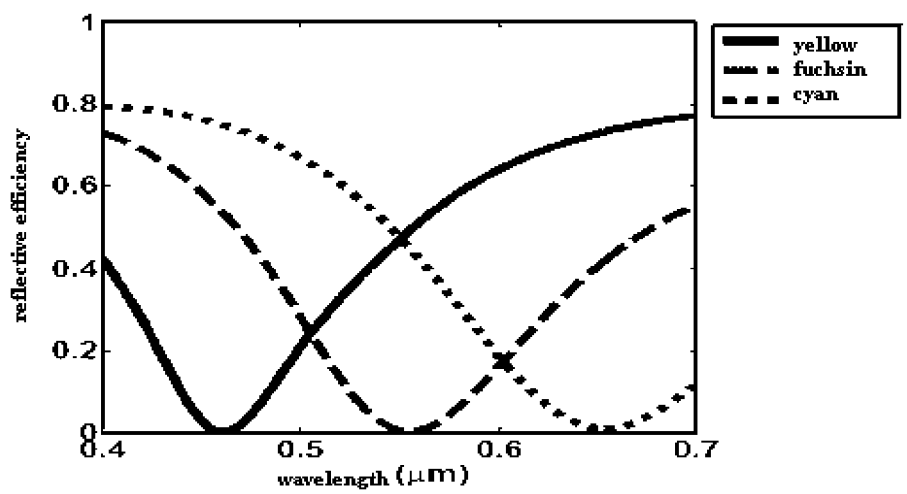
FIG. 6 is a principle diagram of a reflective color filter provided according to an embodiment of the present disclosure.

In an embodiment, by referring to FIG. 5, the reflective color filter includes a body layer 27 and the plurality of projections 25 are provided on an upper surface of the body layer 27.

Embodiments of the present disclosure make no limitation on shape of the projections. For example, a cross section of the projection may be in a rectangle shape, in a circular shape, or the like. When the cross section of the projections is rectangular, a red filter, a blue filter and a green filter may be obtained by adjusting a width and an arrangement period of the projections. As shown in FIG. 4, an arrangement period P of the rectangular projections means a sum of a distance L1 between two adjacent projections and a width W of one projection. When the cross section of the projections is circular, a red filter, a blue filter and a green filter may be obtained by adjusting a diameter and an arrangement period of the projections. As shown in FIG. 3, an arrangement period P of the circular projections means a sum of a distance L2 between two adjacent projections and a diameter D of one projection.

An example in which the cross section of the projections is circular is taken to list some types of reflective color filters.

With regard to a red filter, where P=540 nm, D=500 nm, it may reflect red light when white light is incident to the red filter.

With regard to a green filter, where P=485 nm D=450 nm, it may reflect green light when white light is incident to the green filter.

With regard to a blue filter, where P=320 nm D=300 nm, it may reflect blue light when white light is incident to the blue filter.

With regard to a yellow filter, where P=200 nm D=60 nm, it may reflect yellow light when white light is incident to the yellow filter.

With regard to a fuchsin filter, where P=200 nm D=76 nm, it may reflect fuchsin light when white light is incident to the fuchsin filter.

With regard to a cyan filter, where P=200 nm, D=92 nm, it may reflect cyan light when white light is incident to the cyan filter.

According to an embodiment of the present disclosure, the reflective color filter may be a reflective grating color filter. The reflective grating color filter may include projections on the upper surface of the reflective grating color filter, such as circular projections, rectangular projections, bar/strip projections, or the like.

Figure 7:
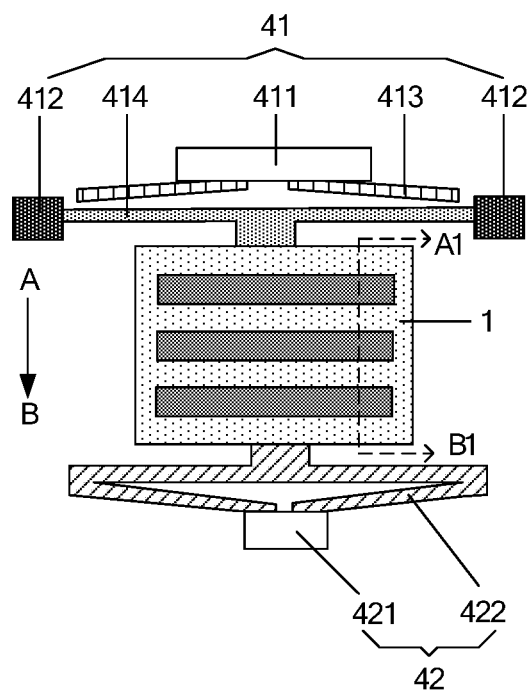
FIG. 7 is a structural schematic view of a MEMS light valve provided according to an embodiment of the present disclosure.

It is noted that the above reflective color filter is mainly implemented by using iso-ionic resonance enhancement effect of the reflective grating. When the outside light (white light) is incident to the filter, due to excitation and coupling effect of the iso-ionic excimer on the surface of the reflective grating, the reflective grating only reflects the light at of a specific wavelength with in an enhanced intensity way, while light at of other wavelengths becomes evanescent wave and its energy will be dissipated by a metal grating layer, such that only the light with one certain color is reflected in a macroscopic view. As for this type of color filter with a filtering characteristic based on this principle, its efficiency for light energy utilization is rather high. For example, the efficiency for light energy utilization may exceed 30%, and commonly, may be up to 50%, and even more than 70%. As shown in FIG. 7, in an example where the reflective color filter reflects yellow light, the reflective color filter has a lower reflectivity to light with other colors, most of which is absorbed and dissipated; for example, the reflectivity of the reflective color filter to light having a wavelength of 0.45 m is zero, i.e., the light is absorbed completely.

In an embodiment, the body layer and the projections of the above reflective color filter may be formed from the same metal. By this way, the projections may be formed through a single patterning process, thereby reducing process. Specifically, the metal may be deposited with a thickness from 100 nm to 220 nm by means of a vacuum evaporation (for example, magnetron sputtering) process so as to form the body layer. The metal may be aluminium, copper, silver, golden or the like. For sake of cost reduction, aluminium may be selected. Subsequently, a mask may be used to pattern the metal so as to form the projections.

In an embodiment, the fixed grating may further include a light absorbing layer located in the second region. The light absorbing layer may be made of a black resin material, or, of course other material. The material for the light absorbing layer is not limited herein.

In an embodiment, the above light valve may further include a control device coupled to the movable grating such that the movable grating is floated and is driven to move in the plane where the movable grating is located.

Figure 9:
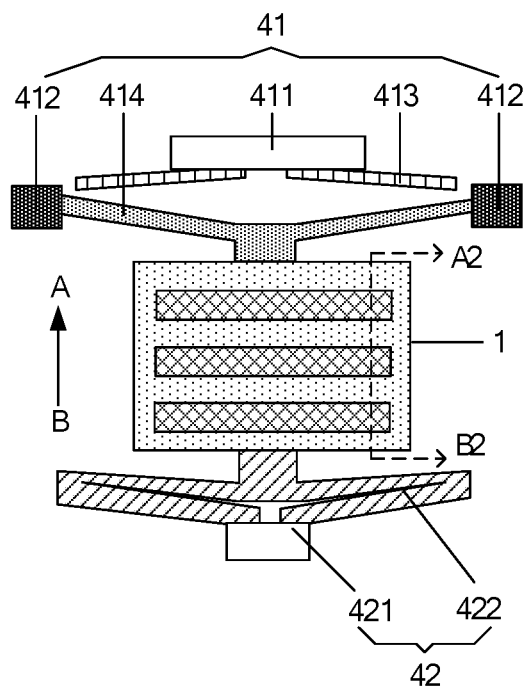
FIG. 9 is a structural schematic view of another MEMS light valve provided according to an embodiment of the present disclosure.

By referring to FIG. 7 and FIG. 9, the control device comprises an electrode drive portion 41 and a deformable retractable portion 42, which are respectively arranged at opposite sides of the movable grating in a movement direction of the movable grating. The electrode drive portion 41 comprises: a drive electrode 411, a sensing electrode 412, and a drive beam 413 and a sensing beam 414 that are arranged to be opposite to each other, wherein the drive electrode 411 is coupled with the drive beam 413 and the sensing beam 414 is respectively coupled with the inducing electrode 412 and the movable grating 1. The deformable retractable portion 42 comprises: a bracket 421 and a deformable beam 422, wherein the deformable beam 422 is respectively coupled to the bracket 421 and the movable grating 1.

It is noted that structure of the control device is not limited to the above structure. Embodiments and drawings of the present disclosure are only illustrated by taking the above structures an example. For example, in an embodiment of the present disclosure, the deformable beam 422 may be an elastic beam, i.e., the deformable beam may be elastic.

Figure 11:
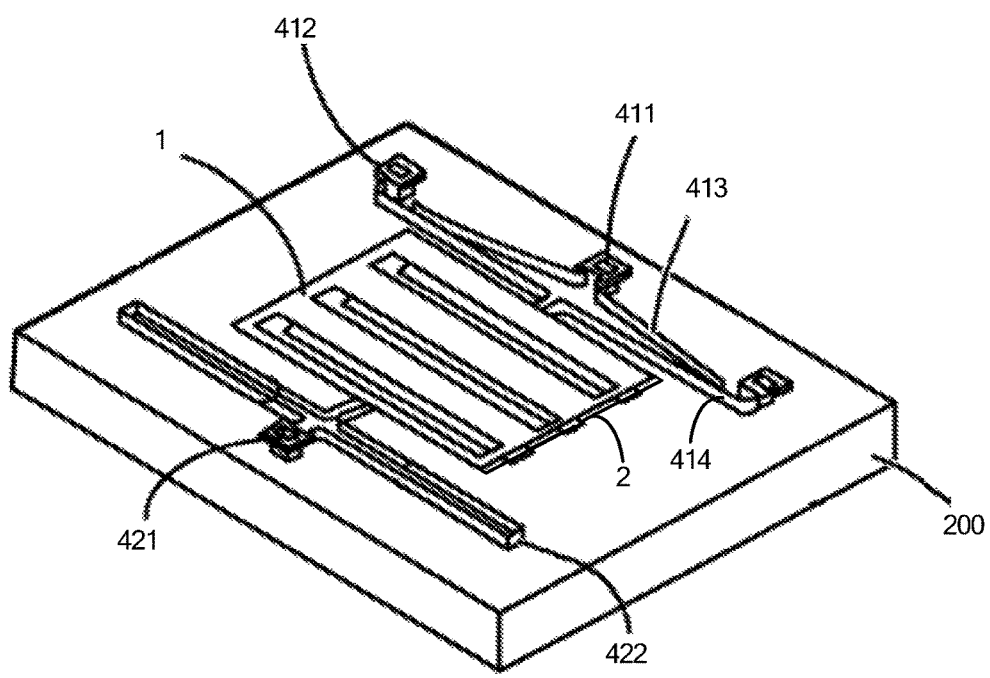
FIG. 11 is a structural schematic view of a further MEMS light valve provided according to an embodiment of the present disclosure.

It is further noted that, as shown in FIG. 11, the above drive electrode 411, the inducing electrode 412 and the bracket 421 may be fixed on a substrate 200 such that the movable grating 1 may be in floating state under supporting of the sensing beam 414 and the deformable beam 422.

Figure 10:
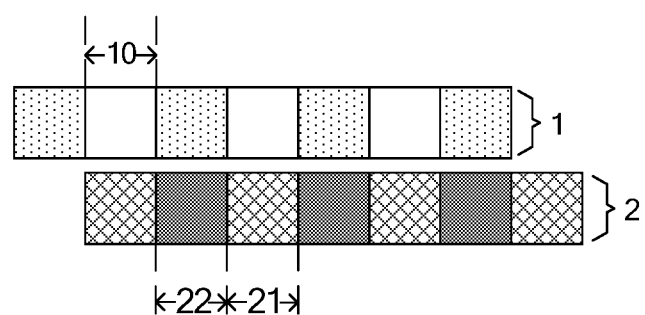
FIG. 10 is a sectional schematic view of the MEMS light valve as shown in FIG. 9 taken along line A2-B2.

As shown in FIG. 7, when voltages on the drive electrode 411 and the inducing electrode 412 have the same polarity, voltages on the drive beam 413 and the sensing beam 414 also have the same polarity. Since charges with the same polarity repel each other, the drive beam 413 and the sensing beam 414 repel each other, causing the sensing beam 414 to drive the movable grating 1 to move in the direction from A to B and thus causing the deformable beam 422 to be in a contraction state. In this moment, a structure as shown in FIG. 9 is obtained. As shown in FIGS. 9 and 10, the first regions 21 of the fixed grating 2 are exposed and the outside light may be incident to the first regions 21 and be reflected by the reflective units located within the first regions.

As shown in FIG. 9, when the voltages on the drive electrode 411 and the inducing electrode 412 have different polarities, the voltages on the drive beam 413 and the sensing beam 414 also have different polarities. Since charges with different polarities attract to each other, the drive beam 413 and the sensing beam 414 attract each other, causing the sensing beam 414 to drive the movable grating 1 to move in the direction from B to A.

Figure 8:
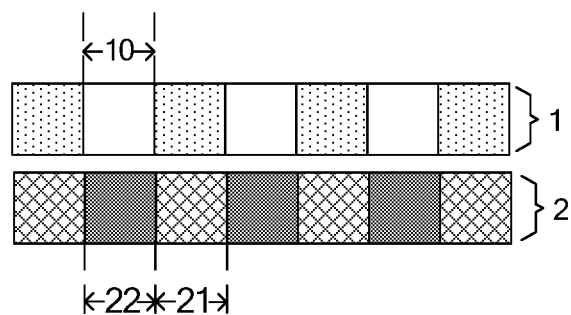
FIG. 8 is a sectional schematic view of the MEMS light valve as shown in FIG. 7 taken along line A1-B1.

In this instance, if the deformable beam 422 is elastic, the elastic deformable beam 422 will also push the movable grating 1 to further move in the direction from B to A, obtaining the structure as shown in FIG. 7. As shown in FIGS. 7 and 8, the second region 22 of the fixed grating 2 is exposed. Since the second region 22 does not reflect light, the outside light is not reflected.

An embodiment of the present disclosure provides a display device comprising a plurality of pixels, each of which is composed of sub-pixels, each of the sub-pixels comprising the light valve provided by any one of the above embodiments.

An embodiment of the present disclosure provides a display device, which may achieve black and white image display by using the outside light. Compared with that in prior art, it has a simpler structure. The display device may be implemented in a television, a digital camera, a mobile phone, a tablet computer and products or components that have a display function.

In an embodiment, the reflective unit of the light valve may be a reflective color filter; the reflective color filter comprises: a plurality of projections provided on an upper surface of the reflective color filter such that the reflective color filter reflects light with one certain color when the outside light is incident to the upper surface provided with the plurality of projections; each of the pixels comprises three sub-pixels which respectively reflect three primary color lights.

Specifically, the three sub-pixels of each of the pixels may have a light valve with a red filter, a light valve with a green filter, and a light valve with a blue filter, respectively, and thus may emit red light, green light and blue light respectively. Based on the three primary color principle, color display may be achieved by mixing the three primary colors. Of course, the three sub-pixels of each of the pixels may have a light valve with a yellow filter, a light valve with a fuchsin filter, and a light valve with a cyan filter, respectively, and thus may emit yellow light, fuchsin light and cyan light respectively. Based on the three primary color principle, color display may be achieved by mixing the three primary colors.

The above description is merely exemplary embodiments of the present disclosure and scope of the present disclosure will not be limited to this. Any modification or equally replacement made within the spirit and scope of the present disclosure shall be included in the protective scope of the present invention. Thus, scope of the present invention shall be defined by the claims.

The invention claimed is:
1. A MEMS light valve, comprising:
a fixed grating partitioned into first regions and second regions, which are arranged alternately, wherein the fixed grating comprises reflective units configured within the first regions for reflecting at least part of incident light and the second regions do not reflect light; and
a movable grating located at a side of the fixed grating to which outside light is incident and movable in a plane where the movable grating is located, wherein the movable grating is capable of blocking part or all of the reflective units during moving;
wherein the reflective units comprise a reflective color filter having a plurality of projections provided on an upper surface of the reflective color filter, and
wherein the projections are configured in an array, and sizes of the projections and spacings between the projections are configured such that the reflective color filter reflects light of a specific wavelength with enhanced intensity while dissipating light having other wavelengths when the outside light in incident to the upper surface provided with the plurality of projections, such that the reflective color filter only reflects the light with a certain color;
the projections are each configured in a point shape and arranged in an array in the first regions;
the reflective color filter is a red filter, in which a sum of the spacing between two adjacent projections and a diameter of each of the projections is 540 nm and the diameter of each of the projections is 500 nm, and is configured to reflect a red light when a white light is incident thereon;
the reflective color filter is a green filter, in which a sum of the spacing between two adjacent projections and a diameter of each of the projections is 485 nm and the diameter of each of the projections is 450 nm, and is configured to reflect a green light when a white light is incident thereon;

the reflective color filter is a yellow filter, in which a sum of the spacing between two adjacent projections and a diameter of each of the projections is 200 nm and the diameter of each of the projections is 60 nm, and is configured to reflect a yellow light when a white light is incident thereon;

the reflective color filter is a magenta filter, in which a sum of the spacing between two adjacent projections and a diameter of each of the projections is 200 nm and the diameter of each of the projections is 76 nm, and is configured to reflect a magenta light when a white light is incident thereon; or the reflective color filter is a cyan filter, in which a sum of the spacing between two adjacent projections and a diameter of each of the projections is 200 nm and the diameter of each of the projections is 92 nm, and is configured to reflect a cyan light when a white light is incident thereon.

2. The MEMS light valve according to claim 1, wherein, the reflective color filter comprises a body layer, wherein the plurality of projections are provided on an upper surface of the body layer.

3. The MEMS light valve according to claim 2, wherein, the body layer and the projections are formed from a same metal.

4. The MEMS light valve according to claim 1, wherein, the light valve further comprises a control device coupled to the movable grating such that the movable grating is floated and is driven to move in a plane where the movable grating is located.

5. The MEMS light valve according to claim 4, wherein, the control device comprises an electrode drive portion and a deformable retractable portion, which are respectively arranged at opposite sides of the movable grating in a movement direction of the movable grating;

the electrode drive portion comprises: a drive electrode, an inducing electrode, and a drive beam and a sensing beam that are arranged to be opposite to each other, wherein the drive electrode is coupled with the drive beam and the sensing beam is respectively coupled with the inducing electrode and the movable grating; and the deformable retractable portion comprises: a bracket and a deformable beam, wherein the deformable beam is respectively coupled to the bracket and the movable grating so as to allow the movable grating to move, and wherein the movable grating is moved by attraction and repulsion between the drive electrode and the inducing electrode.

6. The MEMS light valve according to claim 5, wherein, the deformable beam is elastic.

7. A display device comprising a plurality of pixels, each of which is composed of sub-pixels, wherein, each of the sub-pixels comprises the MEMS light valve according to claim 1.

8. The display device according to claim 7, wherein each of the pixels comprises three sub-pixels which respectively reflect light of three primary colors.

9. A MEMS light valve, comprising:
a fixed grating partitioned into first regions and second regions, which are arranged alternately, wherein the fixed grating comprises reflective units configured within the first regions for reflecting at least part of incident light and the second regions do not reflect light; and a movable grating located at a side of the fixed grating to which outside light is incident and movable in a plane where the movable grating is located, wherein the movable grating is capable of blocking part or all of the reflective units during moving;

wherein the reflective units comprise a reflective color filter having a plurality of projections provided on an upper surface of the reflective color filter, and wherein the projections are configured in an array, and sizes of the projections and spacings between the projections are configured such that the reflective color filter reflects light of a specific wavelength with enhanced intensity while dissipating light having other wavelengths when the outside light in incident to the upper surface provided with the plurality of projections, such that the reflective color filter only reflects the light with a certain color;

wherein the fixed grating further comprises a light absorbing layer located within the second regions.

10. The MEMS light valve according to claim 9, wherein, the light absorbing layer is made of a black resin material.

11. The MEMS light valve according to claim 9, wherein, the light valve further comprises a control device coupled to the movable grating such that the movable grating is floated and is driven to move in a plane where the movable grating is located.

12. The MEMS light valve according to claim 11, wherein,
the control device comprises an electrode drive portion and a deformable retractable portion, which are respectively arranged at opposite sides of the movable grating in a movement direction of the movable grating;

the electrode drive portion comprises: a drive electrode, an inducing electrode, and a drive beam and a sensing beam that are arranged to be opposite to each other, wherein the drive electrode is coupled with the drive beam and the sensing beam is respectively coupled with the inducing electrode and the movable grating; and the deformable retractable portion comprises: a bracket and a deformable beam, wherein the deformable beam is respectively coupled to the bracket and the movable grating so as to allow the movable grating to move, and wherein the movable grating is moved by attraction and repulsion between the drive electrode and the inducing electrode.

13. The MEMS light valve according to claim 12, wherein, the deformable beam is elastic.

14. A display device comprising a plurality of pixels, each of which is composed of sub-pixels, wherein, each of the sub-pixels comprises the MEMS light valve according to claim 9.

15. The display device according to claim 14, wherein the reflective units of the MEMS light valve include a reflective color filter having a plurality of projections provided on an upper surface of the reflective color filter, wherein the projections are configured such that when the outside light in incident to the upper surface provided with the plurality of projections, the reflective color filter only reflects the light with a certain color; and each of the pixels includes three sub-pixels which respectively reflect light of three primary colors.

* * * * *